United States Patent [19]

House et al.

[11] Patent Number: 4,874,831

[45] Date of Patent: Oct. 17, 1989

[54] ROOM-TEMPERATURE-CURED POLYURETHANES AND POLYUREAS

[75] Inventors: David W. House, Arlington Heights; Ray V. Scott, Jr., Addison, both of Ill.

[73] Assignee: UOP, Des Plaines, Ill.

[21] Appl. No.: 208,355

[22] Filed: Jun. 17, 1988

[51] Int. Cl.$^4$ .............................................. C08G 18/18
[52] U.S. Cl. ................................... 528/48; 427/385.5; 427/388.1; 427/389.7; 427/393; 427/393.6
[58] Field of Search ...................... 528/48, 49, 55, 58; 427/385.5, 388.1, 389.7, 393, 393.5, 399.6

[56] References Cited

U.S. PATENT DOCUMENTS

| | | | |
|---|---|---|---|
| 4,513,133 | 4/1985 | Dominquez | 528/49 |
| 4,578,446 | 3/1986 | House et al. | 528/64 |
| 4,584,362 | 4/1986 | Leckart et al. | 528/55 |
| 4,663,201 | 5/1987 | House et al. | 427/388.2 |
| 4,709,003 | 11/1987 | Scott et al. | 528/60 |
| 4,714,512 | 12/1987 | House et al. | 156/306.6 |

*Primary Examiner*—Maurice J. Welsh
*Attorney, Agent, or Firm*—Thomas K. McBride; John F. Spears, Jr.; Jack H. Hall

[57] ABSTRACT

The polyurethanes and polyureas resulting from ambient-temperature-curing isocyanate-terminated urethane prepolymers with N-alkyl-substituted aromatic polyamines and, optionally, with an added polyol, but primary amine-free, in the presence of a combination catalyst comprising an aliphatic carboxylic acid, e.g., adipic, stearic, oleic acids, and an organometallic catalyst containing, e.g., tin, mercury, bismuth, etc. are broadly useful as coatings on the surface of objects made of metal, wood, glass, plastic or masonry materials such as concrete, bricks, etc. or as castings cured in situ. One-shot and quasi-prepolymer systems are also disclosed. The diamine N,N'-di-(sec-butyl)-4,4'-methylenedianiline is a particularly useful diamine.

32 Claims, No Drawings

ROOM-TEMPERATURE-CURED POLYURETHANES AND POLYUREAS

BACKGROUND OF THE INVENTION

As a subclass of commercially available polymers, polyurethane elastomers have several properties whose advantages confer unique benefits on these products. Typically, polyurethanes show high abrasion resistance with high load bearing, excellent cut and tear resistance, high hardness, resistance to ozone degradation, yet are pourable and castable. Compared to metals, polyurethanes are lighter in weight, less noisy in use, show better wear and excellent corrosion resistance while being capable of cheap fabrication. Compared to other plastics, polyurethanes are non-brittle, much more resistant to abrasion, and exhibit good elastomeric memory. Polyurethanes can be used for coatings and adhesives, utilizing secondary amine curing agents, such as taught in applicant's prior U.S. Pat Nos. 4,578,446 and 4,714,512. Polyurea can also be used as disclosed in applicant's prior U.S. Pat. No. 4,663,201 and Dominguez U.S. Pat. No. 4,513,133. Among well-known catalysts used for controlling competing reactions are tertiary amines, organometallic compounds, alkali metal salts of carboxylic acids and carboxylic acids. Also, it may be considered known to cure polyurethane prepolymers with a curing system comprising a dialkyl aromatic secondary amine, a polyol and a primary amine at room temperature using a catalyst system comprising adipic acid and a tin catalyst. However, some applications, such as coatings for concrete structures, such as roads, bridge abutments, parking lots, etc., must also have a very low moisture sensitivity and organo tin catalysts, such as dibutyl tin dilaurate, catalyze reaction of the prepolymer with water and, therefore, can only be used in small amounts, and care must be taken to keep exposure to moisture at a minimum.

Part of the utility of polyurethanes derives from their enormous diversity of properties resulting from a relatively limited number of reactants. Typically, polyurethanes are prepared on site by curing urethane prepolymers, which are adducts of polyisocyanates and polyhydric compounds. A large class of such prepolymers are approximately 2:1 adducts of a diisocyanate, OCN—Y—NCO, and a diol, HO—Z—OH, whose resulting structure is OCN—Y—NHCO$_2$—Z—OCONH—Y—NCO. Although Y is susceptible of great variety, usually being a divalent alkyl, cyclohexyl, or aromatic radical, in fact the most available urethane prepolymers are made from 2,4-toluenediisocyanate (TDI), or 80/20 mixtures with 2,6-toluenediisocyanate or 4,4'-methylenediphenyldiisocyanate (MDI). The diols forming the "backbone" of the polymer, containing the "soft segments," display a greater range of variety; Z may be a divalent alkyl radical (i.e., an alkylene group) and frequently are ethers or esters which are condensation products of glycols with alkylene oxides and dicarboxylic acids, respectively.

Polyureas are prepared in similar, known manner as the polyurethane prepolymers described above except that the backbone of the polymer is formed by the reaction of a polyamine (rather than a polyol) with a diisocyanate. The polyamines and polyols used in the reaction will be referred to as "backbone" polyols or "backbone" polyamines to distinguish them from the curing agents of the present invention.

In the so-called "one-shot" process, a separate step of forming a prepolymer is eliminated and all reactants are brought together at the same time or substantially simultaneously. This term may also be applied where the typical "prepolymer" components are brought together first and within a very short time the curing agent and other additives are mixed together. The "one-shot" method of processing is particularly prevalent in MDI- or modified MDI-based systems. The process generally requires that the various components have similar reactivities with the isocyanate components. The higher heat of reaction creates limitations and some complications with larger cast parts of thicker coatings, but is not particularly deleterious or can be tolerated in the applications contemplated here, and, in fact, may be advantageous in promoting a faster cure without requiring the addition of heat.

"Quasi-prepolymers" may also be formed, in which only a part of the theoretical equivalents of the backbone polyol are reacted with the isocyanate. The remaining backbone polyol is added at the time the curing agent and catalysts are blended.

Polyurethanes and polyureas are formed by curing the urethane prepolymer. Curing is the reaction of the terminal isocyanate groups of the prepolymer with active hydrogens of a polyfunctional compound so as to form high polymers through chain extension and, in some cases, cross-linking. Diols, especially alkylene diols, are the most common curing agents, especially for MDI-based urethane prepolymers, and representing such diols with the structure HO—X—OH, where X is an organic moiety, most usually an alkylene group, the resulting polymer has as its repeating unit,

—Y—NHCO$_2$—Z—OCONH—Y—NHCO$_2$—X—OCONH—

Where a triol or a higher polyhydric alcohol is used, cross-linking occurs to afford a nonlinear polymer.

Other polyfunctional chemicals, especially diamines, are suitable as a curing agent. For example, 4,4'-methylene-bis-orthochloroaniline, usually referred to as MOCA or MBOCA, is a primary diamine curing agent which is both a chain extender and a cross-linker for TDI-based urethane prepolymers. Generally speaking, however, primary diamines react with prepolymers, and especially MDI-based prepolymers, so quickly that they are not usable as curing agents. Recently, certain secondary diamines have been found to have an acceptably long pot life, and act as chain extenders with urethane prepolymers. Such secondary diamines as N,N'-dialkyl-4,4'-methylenedianilines, N,N'-dialkyl-phenylene-diamines, and polyfunctional oligomers based thereon, are generally effective curing agents for a broad range of urethane prepolymers at elevated temperatures. Polyhydric alcohols have also been used as curing agents because their reaction with urethane prepolymers is sufficiently fast to be convenient, but not so fast as to make it difficult to work with the resulting polymer.

Previous attempts to cure polyurethane and polyurea coatings at ambient temperature have involved the use of a curing agent which includes a primary amine which, as mentioned above, are very fast. To applicants' knowledge, no one has utilized our secondary amine curing agents under ambient conditions to obtain an adequately cured TDI or MDI-based polyurethane coatings without using a prmary amine as a co-curing agent.

Polyurethanes find extensive application as coatings and adhesives. Among the properties of polyurethanes particularly desirable in the coating art are their chemical resistance, light stability, flexibility, toughness, weatherability, moisture resistance, abrasion resistance, gloss and color retention, and impact resistance. In polymers useful for coating or adhesive applications, it is desirable that the tack-free time be reasonably short, i.e., within about 48 hours or preferably within about 18 hours, and gel time long enough for the material to be coated onto a substrate. We have found that both TDI- and MDI-based prepolymers can be cured at ambient temperatures with the secondary amines we previously described without the inclusion of primary amine co-curing agents to obtain resins which are particularly suitable as coatings having reduced moisture sensitivity by providing a particular catalyst combination comprising an aliphatic acid, especially fatty acids, e.g., adipic, oleic or stearic acid and an organo-metallic catalytic compound, containing, especially mercury or bismuth.

SUMMARY OF THE INVENTION

The object of this invention is to use particular polyurethanes and polyureas as castings, coatings and adhesives which are curable at ambient temperatures. An embodiment comprises the use of polyurethanes or polyureas resulting from curing a diisocyanate-terminated prepolymer with an aromatic N,N'-di-alkyl diamine in the presence of a catalyst system comprising an aliphatic carboxylic acid and an organometallic catalyst compound containing, e.g., tin, mercury or bismuth. Another embodiment involves the use of polyurethane and polyureas resulting from the curing of a quasi-prepolymer with the above curing system in the presence of our catalyst system. A "one-shot" system constitutes another embodiment. Other embodiments will be apparent from the description which follows.

DESCRIPTION OF THE INVENTION

The invention herein is the use as castings, coatings and adhesives of polyurethanes or polyureas resulting from curing, under ambient conditions, a polyisocyanate which may be either an aliphatic or aromatic diisocyanate-terminated prepolymer or quasi-prepolymer, with a secondary aromatic alkyl diamine alone, or with a polyol as sole curing agent in the presence of a combined catalyst consisting essentially of an aliphatic carboxylic acid and an organometallic compound containing, e.g., tin, mercury or bismuth. Bismuth is particularly preferred, combined with oleic acid as the sole co-catalysts. It has been found that such polyurethanes or polyureas have properties which lend themselves especially well to the coating art; they find particular application as coatings for cement pavement, due to their ability to be cured at ambient temperatures.

The urethane prepolymers used in practice of this invention are isocyanate-terminated adducts of a polyisocyanate and polyhydric alcohols. Prepolymers which are adducts of diisocyanates and dihydric alcohols, or diols, are the most commonly used prepolymers in commerce today and will be used to exemplify and illustrate urethane prepolymers generally. However, it is to be clearly understood that this invention is applicable to urethane prepolymers generally, and should not be restricted to those prepolymers arising from diisocyanates and diols.

The isocyanates used in the practice of this invention are polyisocyanates which are at least diisocyanates. Examples of such polyisocyanates OCN—Y—NCO, which may be used in the practice of this invention include phenylene diisocyanate, toluene diisocyanate (TDI), xylene diisocyanate, 1,5-naphthalene diisocyanate, chlorophenylene 2,4-diisocyanate, bitoluene diisocyanate, dianisidine diisocyanate, tolidine diisocyanate and alkylated benzene diisocyanates generally; methylene-interrupted aromatic diisocyanates such as methylene-diphenyl-diisocyanate, especially the 4,4'-isomer (MDI) including alkylated analogues such as 3,3'-dimethyl-4,4'-diphenyl-methane diisocyanate; such hydrogenated materials as cyclohexylene diisoycanate, 4,4'-methylenedicyclohexyl diisocyanate (HMDI); mixed aralkyl diisocyanates such as the tetramethylxylyl diisocyanates, OCN—C(CH$_3$)$_2$—C$_6$H$_4$C(CH$_3$)$_2$-NCO, and the diisocyanate popularly referred to as isophorone diisocyanate, which is 3,3,5-trimethyl-5-isocyanate-methyl-cyclohexyl isocyanate; and polymethylene isocyanates such as 1,4-tetramethylene diisocyanate, 1,5-pentamethylene diisocyanate, 1,6-hexamethylene diisocyanate, 1,7-heptamethylene diisocyanate, 2,2,4- and 2,4,4-trimethylhexamethylene diisocyanate, 1,10-decamethylene diisocyanate.

Among the diols frequently used in making urethane prepolymers are alkylene diols, such as ethylene glycol, 1,3-propylenediol, 1,4-butylenediol, and so forth. Diolethers and diolesters find widespread use in making urethane prepolymers. The diolethers, as exemplified by poly(alkyleneoxy) diols, are typically condensation products of alkylene oxides, such as ethylene oxide and propylene oxide with glycols or water, with the number of alkyleneoxy groups in the molecule generally increasing as the ratio of oxide to glycol increases. Examples of glycols include ethylene glycol, propylene glycol and butylene glyclo, and exemplary of the alkylene oxides are ethylene oxide, propylene oxide, butylene oxide, amylene oxide, tetramethyleneglycol and tetrahydrofuran. The diolesters often are esters of dicarboxylic acids and diols, especially the glycols previously exemplified. Most typically, such products are esters of linear or aromatic dicarboxylic acids, such as succinic, glutaric, adipic, pimelic, suberic, azelaic, sebacic, phthalic, terephthalic, isophthalic acids, and so on. But it needs to be stressed again that the structures cited above are merely illustrative and exemplary of the diisocyanates and diols which may be used in making a urethane prepolymer, and are not intended to be exhaustive.

The ratio of reactants used in preparing the prepolymer is generally expressed in terms of reative numbers of isocyanate and hydroxyl groups, respectively. In this context, an equivalent amount of isocyanate and diol contains an equal number of isocyanate and hydroxyl groups. The prepolymer may contain from about 1.5 to about 4.0 equivalents of diisocyanate relative to diol, but most commonly there are about 2 equivalents diisocyanate per diol.

The polyurethane elastomer is made by reacting the polyisocyanate prepolymer with a primary amine-free sole curing agent comprising a secondary aromatic alkyl diamine of one of the following structures:

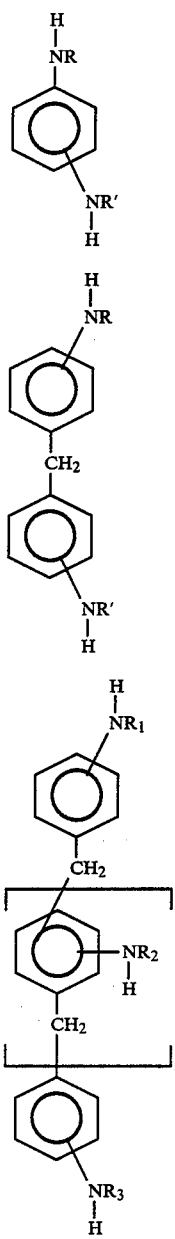

(1)

(2)

(3)

Each alkyl group, R, R', $R_1$, $R_2$ and $R_3$, independently selected, contains from 1 to about 20 carbon atoms, $R_2$ and one of $R_1$ or $R_3$ may additionally be H; n is an integer from 1 to about 10. Alkyl groups containing from 4 to 10 carbon atoms, and especially from 4 to about 8 carbon atoms, are particularly preferred. The alkyl group may be a primary, secondary, or tertiary alkyl group, although when the alkyl is tertiary there is the risk that cure time may be too long to be commercially acceptable. Secondary alkyl groups are preferred, and among these the secondary butyl group is particularly preferred. Of the positional isomers of structural formula (2) possible, the 4,4'-methylenedianilines are most desirable.

The polyamine curing agents of structural formula (3) are at least about 33% alkylated, preferably at least about 67%, with polyamines which are at least 90% alkylated being even more desirable. What is meant by, for example, the term "67% alkylated" is that 67%, or two-thirds, of the amino groups in the polyamine are alkylated. It has been found that if the degree of alkylation is too low, the polyamine is glassy, whereas the viscous liquid which is characteristic of higher alkylation is desired for ease of handling. The alkylated polyamines of this invention typically are prepared by conventional alkylation procedures performed on the precursor primary amine. Largely because of steric factors, the terminal amino groups are preferentially alkylated. Therefore, where there is less than total alkylation the internal amino groups of the polyamine are less likely to be alkylated than the terminal amino groups. Thus, for example, where the amine is 67% alkylated and n is 1 the polyamine will consist largely of a product where both terminal amino groups are monoalkylated and the internal amino group is not alkylated. Additional details regarding the preparation and application of these polyamine curing agents can be found in U.S. Pat. No. 4,709,003, which is incorporated herein by reference.

Defining an equivalent of diamine as an amount which furnishes as many amino groups as there are isocyanate groups in the polyisocyanate prepolymer, from about 0.80 to about 1.2 equivalents of diamine are used in curing, with the range from about 0.85 to about 1.1 being the more usual one. Since each amino group has only one hydrogen, secondary amines of structural formulas (1) and (2) act by themselves only as a chain extender and not as a cross-linker. The secondary amines of structural formula (3), however, may also act as cross-linkers. The curing mixture may contain other materials, including polyols, in addition to, or partly replacing, the diamines. Where a polyol is present, it typically will replace from about 5% to about 50% (by equivalents) of the diamine, and may even replace up to about 75% (by equivalents). It is to be understood that such a curing mixture is contemplated as being within the scope of this invention.

It is necessary to catalyze the reaction in order to obtain a cure at ambient temperatures. We have found that a combination of an aliphatic carboxylic acid and organometallic co-catalyst is essential to achieve this objective.

The aliphatic carboxylic acid may be a mono- or di-carboxylic acid having from 2 to 30 carbon atoms. Adipic acid is operable, but, since it is a solid, it is less adaptable to use under field conditions, since it must be solubilized or uniformly mixed with the reactants. Other carboxylic acids are useful, but oleic acid and stearic acid are preferred because of superior results, and oleic acid is particularly preferred since it is liquid.

The organometallic co-catalyst may be an organic complex which contains tin, lead, mercury, bismuth or other metals as the complexing metal. Exemplary organo-metallic complexes are dibutyl tin dilaurate (DBTDL), dibutyl tin mercaptide, stannous octoate, phenyl mercuric carboxylates, bismuth stannate, bismuth stearate and diphenyl bismuth alkylates or carboxylates. These catalysts may be used at combined levels of (based on total composition weight) from about 0.05% to about 2%, preferably 0.5–1.5%. MDI-based polyurethanes will normally require much less catalyst than TDI-based catalysts. Because tin tends to catalyze reactions with water which forms $CO_2$ and thereby creates bubbles and resultant pinholes in the coating and many mercury and lead compounds are toxic and dangerous to work with; bismuth organo-complexes are, therefore, preferred. A particularly preferred bismuth complex is bismuth neodecanoate (commercially available from Cosan Chemical Corporation as Coscat 83 catalyst). Others may be bismuth salts of other carboxylic acids having from 2 to 20 carbon atoms in the molecule. The preparation of such catalysts are disclosed in U.S. Pat. No. 4,584,362, incorporated herein by reference.

The catalyzed reaction between the polyisocyanate and the diamine will take place at between about 15° C. and about 75° C., and preferably between about 15° C. (59° F.) and 40° C. (104° F.). The temperatures which may be used in this invention afford the possibility of mixing the prepolymer with the curing agent and catalyst in the field and by applications where elevated temperatures may not be conveniently obtained. Nevertheless, in most cases, the curing to a tack-free state must take place, at ambient temperatures, within a reasonable time, e.g., within 48 hours and, preferably within 18 hours, or, overnight. The time interval from mixing the diamine and polyisocyanate until the mixture is very difficult to pour, the pot life, must be long enough to permit a reasonable amount of pouring and handling.

The polyurethanes and polyureas of this invention may be used as a coating for objects of metal, glass, wood, masonry, or plastic, for one feature of these polyurethanes and polyureas is their ability to adhere strongly to a great variety of surfaces. Such versatility makes the materials of this invention particularly valuable. Some of the possible applications relate to road or parking lot coatings, metal roll covering, chute liners and as a sealant. The best applications for these compositions involve formation in the field where elevated temperatures cannot be conveniently obtained. Cast elastomers are also capable of being cured at room temperature, into a variety of useful products.

The polyurethanes and polyurea surface coatings described here may be applied as 1-pack systems. See R. Heath, Urethanes Technology, March, 1985, 17-20. In the 1-pack system the fully reacted polyurethane or polyurea is either in solution or is dispersed in a suitable medium. Examples of solvents which are suitable for use in the practice of this invention are aromatics generally, such as benzene, toluene, the xylenes, ethylbenzene, propylbenzene, and so forth; ketones, especially acetone methylethylketone; and halogenated solvents such as chloroform, carbon tetrachloride, trichloroethylene, and so forth. The nature of the solvent is not particularly critical so long as it is unreactive with the polyurethane or polyurea, although a solvent which can be readily evaporated is desirable. The same attributes apply to the dispersing medium, where a suspension of the polyurethane or polyurea is used instead of a solution, with water often being a suitable dispersing medium.

The solution or dispersion of the polyurethane or polyurea may be applied to the surface of the object in any convenient way. Often such material is sprayed on a surface, although it may be painted on, the surface may be dip-coated, roller coated, and so on. Such methods of application are well known in the art and need not be elaborated upon further. After the coating has been applied, the solvent or dispersing medium is evaporated at ambient temperature.

In the 2-pack system, a polyisocyanate prepolymer and the remaining components of the reaction, including curing agents, catalysts, etc. are applied to a surface of the object, and the mixture is reacted or cured at ambient temperature to form the polyurethane or polyurea. As conventionally practiced, the polyisocyanate and the curing agent/catalyst system are mixed immediately before applying to the surface of the object. However, it is possible to apply the polyisocyanate and the curing agent/catalyst system separately. In either event, the final polyurethane or polyurea results from their reaction at ambient temperatures over a period of time. Curing occurs at temperatures from about 15° C. up to about 75° C. in less than about 48 hours, preferably overnight or within about 18 hours.

EXAMPLES

The examples which follow are only illustrative of the invention, which is not to be limited thereby in any way.

In each of the following examples, the prepolymer and the curing agent (containing any catalyst) were thoroughly mixed together in a glass beaker at room temperature using a mechanical stirrer. The stoichiometry of the curing agent was always about 95%. Care was taken to minimize the incorporation of bubbles into the polymer. The mixed polymer was then poured into open molds and allowed to cure in the open without a cover plate. After the polymer reached a tack value of at least 5.5, it was removed from the mold.

The mechanical properties shown in Table 3 of the polymers were determined using ASTM methods. Hardness was measured using ASTM method D2240, tear resistance D624, tear propagation resistance (split tear) using D1938, and resilience using D2632. Tensile strength, elongation, and moduli were measured using D412. The following table defines the tack values for the urethane coatings produced in the examples. It is particularly useful as a qualitative standard for evaluating these materials in the field.

TABLE 1

| \multicolumn{2}{c}{TACK VALUES FOR URETHANE COATINGS (Glass Rod/Room Temperature)} |  |
|---|---|
| Value | Description |
| 0 | Polymer pulls up over ⅛ inch |
| 1 | Polymer pulls up between 1/16 and ⅛ inch |
| 2 | Polymer pulls up less than 1/16 inch |
| 3 | Polymer indents rather than pulls up (transition) |
| 4 | Polymer indents very little, but is still tacky (Very lint tacky) |
| 5 | Polymer almost completely free of tack (Slightly lint tacky) |
| 6 | Completely tack-free |

A tack value of 5.5 is considered the minimum acceptable.

EXAMPLE I

In this example, the prepolymer was a toluene diisocyanate-poly(propylene glycol) (TDI-PPG) endcapped with isocyanate groups, having an NCO content of about 2.4%. The curing agent was a 70/30 mixture (based on equivalents of N,N'-di-sec-butyl-4,4'-methylene dianiline and a commercial polyol tetra propoxylated ethylene diamine (Quadrol ®). A catalyst combination of 1% (total weight of composition) stearic acid and 0.5% of a phenyl mercurous carboxylate (Cocure ® 26—Cosan Chem. Corp.) was used.

EXAMPLE II

Example I was repeated except that oleic acid was the acid used in the catalyst.

EXAMPLE III

In this example, a hydrogenated MDI-based polyether (hereafter HMDI) with an isocyanate content of 10.3% was the prepolymer. The curing agent was a 70/30 (equiv.) mixture of N,N'-di-sec-butyl-p-phenylenediamine and Quadrol and the catalyst combination was 1.0% oleic acid/0.5% Cocure 26.

EXAMPLE IV

Example III was repeated except that the curing agent was a 70/30 (equiv.) mixture of N,N'-di-sec-octyl p-phenylenediamine and Quadrol, catalyst No. 1 was 0.5% oleic and catalyst No. 2 was 0.25% of bismuth neodecanoate (available as Coscat® 83 from Cosan Chem. Corp.)

EXAMPLE V

Example III was repeated, except that the curing agent was a 70/30 (equiv.) mixture of N,N'-di-sec-butyl-4,4'-methylene dianiline and Quadrol and the catalyst combination was 0.5% oleic acid and 0.25% Coscat 83.

EXAMPLE VI

Example III was repeated, except that the curing agent of Example V was used and the catalyst was 0.5% oleic acid and 0.25 DBTDL.

EXAMPLE VII

Example I was repeated except that the catalyst was 1.0% adipic acid and 0.5% DBTDL. The cure was marginal, but could be improved by using either an organo-mercuric or bismuth compound.

EXAMPLE VIII

Example I was repeated except that the curing agent was a poly(methylenedianiline) (Poly MDA) from Upjohn Co. which was alkylated in the same manner as described in Example I of the aforementioned U.S. Pat. No. 4,709,003 to produce a sec-butylated aromatic polyamine. The analysis of this modified polyamine showed an average molecular weight of about 400, an average functionality of 2.7, and is greater than 95% sec-butylated. The modified polyamine is composed of a mixture of compounds of the structures represented by (2) and (3) where for (3), n=1, 2, and 3. The relative amounts of the components represented by (3) can be expressed as $n=1>n=2>n=3$.

A summary of components and reaction times is contained in the following Table:

TABLE 2

| EX # | Prepolymer | Curing Agent | Cat #1 %/acid | Cat.#2 %/org. met. | Gel Time min | Tack Value After 18 hr | Tack Value After 48 hr |
|---|---|---|---|---|---|---|---|
| I | TDI—PPG | #1*/Quadrol | 1.0 steric | 0.5 Cocure 26 | 60 | 6 | 6 |
| II | TDI—PPG | #1*/Quadrol | 1.0 oleic | 0.5 Cocure 26 | 60 | 5.5 | 6 |
| III | HMDI | #2*/Quadrol | 1.0 oleic | 0.5 Cocure 26 | 93 | 6 | 6 |
| IV | HMDI | #3*/Quadrol | 0.5 oleic | 0.25 Coscat 83 | 4 | | 6 |
| V | HMDI | #1*/Quadrol | 0.5 oleic | 0.25 Coscat 83 | 4 | 6 | 6 |
| VI | HMDI | #1*/Quadrol | 0.5 oleic | 0.25 DBTDL | 18 | 6 | 6 |
| VII | TDI-PPG | #1*/Quadrol | 1.0 adipic | 0.50 DBTDL | 60 | 5 | 5 |
| VIII | TDI-PPG | #4* (UPjohn) | 1.0 stearic | 0.5 Cocure 26 | 60 | 4 | 5.5 |

*#1 = N,N'—di-sec-butyl-4,4'-methylenedianiline
2 = N,N'—di-sec-butyl-p-phenylenediamine
3 = N,N'—di-sec-octyl-p-phenylenediamine
4 = 95% sec-butylated poly(methylenedianiline).

The mechanical properties of the polymers obtained in selected Examples are set forth in the following Table:

TABLE 3

| EX # | Shore Hardness | Avg. % Shrink | Tear Res. (PLI) | Split Tear (PLI) | Tensile psig | Elong. % | Resilience % |
|---|---|---|---|---|---|---|---|
| III | 53 D | 0.005 | | | | | |
| V | 51 D | 0.005 (in) | 360 | 160 | 3000 | 240 | 40 |
| VI | 55 D | 0.005 | 370 | 170 | 2960 | 220 | 41 |

The Shore Hardness of the other Examples were as follows:

| Example No. | Shore Hardness |
|---|---|
| I | 39A |
| II | 40A |
| IV | 40D |
| VII | 33A |
| VIII | 46A |

What is claimed is:

1. A method of coating an object of metal, masonry, glass, wood, or plastic comprising applying to a surface of said object a polyurethane or polyurea composition resulting from the reaction at ambient conditions of a polyol or polyamine, a polyisocyanate and a primary amine-free curing composition comprising an aromatic alkyl-substituted secondary polyamine having a structure selected from the group consisting of

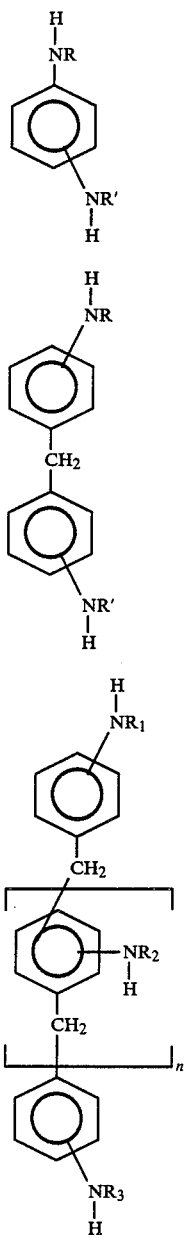

(1)

(2)

(3)

where each alkyl group R, R', $R_1$, $R_2$ and $R_3$ may be independently selected, $R_2$ and one of $R_1$ and $R_3$ may also be H and contains from 1 to about 20 carbon atoms, in the presence of a catalytic composition comprising an aliphtic carboxylic acid and an organometallic catalytic compound.

2. The method of claim 1 where said curing composition contains a second polyol.

3. The method of claim 2 where from about 5 to about 50% (by equivalents) of the curing composition is said second polyol.

4. The method of claim 1 where said coating composition is a solution or dispersion.

5. The method of claim 1 where said aromatic alkyl-substituted secondary polyamine is an N,N'-dialkyl-p-phenylenediamine.

6. The method of claim 5 where the alkyl group is the sec-butyl group.

7. The method of claim 5 where the alkyl group is sec-octyl.

8. The method of claim 1 where said aromatic alkyl-substituted secondary polyamine is an N,N'-dialkyl-4,4'-methylenedianiline.

9. The method of claim 8 where said aromatic alkyl-substituted secondary polayamine is N,N'-di-(sec-butyl)-4,4'-methylenedianiline.

10. The method of claim 1 where said aromatic alkyl-substituted secondary polyamine is an N-alkylated poly(methylenedianiline).

11. The composition of claim 10 wherein said alkyl groups are sec-butyl.

12. The method of claim 1 where the temperature is from about 15° to about 40° C.

13. The method of claim 1 wherein said organometallic catalytic compound contains tin, mercury or bismuth.

14. The method of claim 1 wherein said organometallic compound is bismuth neodecanoate.

15. A method of coating an object of metal, masonry, glass, wood, or plastic comprising applying to a surface of said object a polyurethane or polyurea resulting from the reaction at ambient temperature of a polyisocyanate-capped polyol or polyamine prepolymer and a primary amine-free curing composition comprising an aromatic alkyl-substituted secondary polyamine having a structure selected from the group consisting of

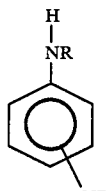

(1)

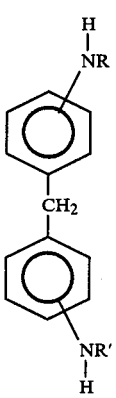

(2)

-continued

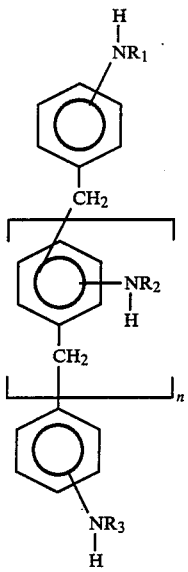

(3)

where each alkyl group R, R', $R_1$, $R_2$ and $R_3$ may be independently selected, contains from 1 to about 20 carbon atoms, $R_2$ and one of $R_1$ and $R_3$ may also be H, and n is an integer from 1–10, in the presence of a catalytic composition comprising an aliphatic carboxylic acid and an organometallic catalytic compound.

16. The method of claim 15 where said curing composition contains a second polyol.

17. The method of claim 16 where from about 5 to about 50% of the curing composition is said second polyol.

18. The method of claim 15 where said coating composition is a solution or dispersion.

19. The method of claim 15 where said aromatic alkyl-substituted secondary polyamine is an N,N'-dialkyl-p-phenylenediamine.

20. The method of claim 19 where the alkyl group is the sec-butyl group.

21. The method of claim 19 wherein said alkyl group is sec-octyl.

22. The method of claim 15 where said aromatic alkyl-substituted secondary polyamine is an N,N'-dialkyl-4,4'-methylenedianiline.

23. The method of claim 22 where said alkyl groups are sec-butyl.

24. The method of claim 15 wherein said aromatic alkyl-substituted secondary polyamine is an N-alkylated poly(methylenedianiline).

25. The method of claim 24 wherein said alkyl groups are sec-butyl.

26. The method of claim 24 wherein said aromatic alkyl-substituted secondary polyamine is at least about 67% alkylated.

27. The method of claim 24 wherein said polymer is at least about 90% alkylated.

28. The method of claim 15 where the temperature is from about 15° to about 40° C.

29. The method of claim 15 wherein said organometallic catalytic compound contains tin, mercury or bismuth.

30. The method of claim 15 wherein said organometallic compound is bismuth neodecanoate.

31. The method of claim 29 wherein said aliphatic carboxylic acid is oleic acid.

32. The method of claim 30 wherein said aliphatic carboxylic acid is oleic acid.

* * * * *